United States Patent
Suzue

(10) Patent No.: US 8,416,430 B2
(45) Date of Patent: Apr. 9, 2013

(54) INFORMATION PROCESSING APPARATUS

(75) Inventor: Tadashi Suzue, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 594 days.

(21) Appl. No.: 12/726,948

(22) Filed: Mar. 18, 2010

(65) Prior Publication Data

US 2010/0241833 A1 Sep. 23, 2010

(30) Foreign Application Priority Data

Mar. 23, 2009 (JP) .................. 2009-069595

(51) Int. Cl.
*G06F 9/44* (2006.01)
*G06F 3/12* (2006.01)
*H04N 1/46* (2006.01)

(52) U.S. Cl. ............... 358/1.13; 358/1.16; 358/1.18; 358/530; 712/220

(58) Field of Classification Search ............... None
See application file for complete search history.

(56) References Cited

U.S. PATENT DOCUMENTS

2010/0172438 A1* 7/2010 Koyanagi et al. ........... 375/296

FOREIGN PATENT DOCUMENTS

| JP | 2-22377 | 1/1990 |
| JP | 2007-172127 | 7/2007 |
| JP | 2007-193744 | 8/2007 |

OTHER PUBLICATIONS

Japanese Office Action in corresponding Japanese Application No. 2009-069595 mailed Sep. 25, 2012, Mailing No. 643025.

\* cited by examiner

*Primary Examiner* — Thomas Lett
(74) *Attorney, Agent, or Firm* — Finnegan, Henderson, Farabow, Garrett & Dunner, L.L.P.

(57) ABSTRACT

Disclosed is an information processing apparatus in which various kinds of information are processed in either the real time processing mode or the non-real time processing mode. The apparatus includes an operation display section to accept an inputted instruction, an image processing section to apply a processing to image information and a processor provided with a plurality of same cores. The real-time processing unnecessary process that is related to the operation display section, is fixed onto one of the plurality of same cores so that the one of the plurality of same cores is in charge of controlling the real-time processing unnecessary process, while, the real-time processing necessary process that is related to the image processing section, is fixed onto another one of the plurality of same cores so that the other one of the plurality of same cores is in charge of controlling the real-time processing necessary process.

11 Claims, 3 Drawing Sheets

FIG. 2

| NECESSARY OR UNNECESSARY OF REAL-TIME PROCESSING | CONTENTS OF PROCESS | | CORE ASSIGNMENT |
|---|---|---|---|
| REAL-TIME PROCESSING NECESSARY PROCESS | HARDWARE REAL TIME FAMILY: PROCESS RESPONSE (WRITE CONTROL, SCANNER CONTROL, ASIC IMAGE PROCESSING, STORAGE CONTROL) | | CORE-a |
| REAL-TIME PROCESSING UNNECESSARY PROCESS | SOFTWARE REAL TIME FAMILY: EXTERNAL STORAGE PROCESSING, OPERATING SECTION CONTROL, COMMUNICATION CONTROL (NETWORK APPLICATION PROGRAM INCLUDING MAIN-BODY CONTROL) | | CORE-b |
| | NON REAL TIME FAMILY: DEVICE INITIALIZATION PROCESSING, NETWORK APPLICATION PROGRAM (WEB, ETC.), UTILITY PROCESSING (BACKUP, RESTORE) | | |

INFORMATION PROCESSING APPARATUS

This application is based on Japanese Patent Application NO. 2009-069595 filed on Mar. 23, 2009, with Japan Patent Office, the entire content of which is hereby incorporated by reference.

BACKGROUND OF THE INVENTION

The present invention relates to an information processing apparatus in which various kinds of information are processed in either a real time processing mode or a non-real time processing mode, both co-existing in the apparatus, and specifically relates to improvements of processing efficiency and scheduling aspects of a processor provided in the information processing apparatus.

With respect to the conventional image forming apparatus, there has been well-known that, in the case that small-sized jobs in regard to the image forming operation are continuously implemented or the like, the responsivity of the operating section of the image forming apparatus concerned is getting worth. In this connection, in such the conventional image forming apparatus serving as an image production apparatus, although a high-speed depicting GPU (Graphical Processing Unit) is allotted to the operating section, the depiction instruction controlling operation is implemented by employing the main-body single core CPU (Central Processing Unit). When a high-speed image output processing is performed in the abovementioned image production apparatus, there has arisen such a problem that the depicting instruction of the operating section has been delayed due to the waiting time for process transitions caused by the single core CPU, and accordingly, the responsivity of the depiction processing of the operating section, which is allotted as a low priority thread process, is deteriorated.

Further, generally speaking, the operation for processing a job, to be conducted in the normal-type copier, is performed in such a manner that plural processes are performed in parallel and in conjunction with each other. Accordingly, the copier as a whole is constituted by various kinds of modules and circuit boards in which plural CPUs having heterogeneous functions and characteristics, being different form each other, are respectively provided, and a total controlling circuit board in which a main CPU controls the abovementioned plural processes, in such a manner that the total controlling circuit board unifies the plurality of modules and circuit boards.

In the above-configuration of the conventional copier, a plurality of single core CPUs is employed so as to activate the plural processes in parallel by using the thread processing mechanism provided in the OS (Operating System).

For instance, with respect to initialization processing of a plurality of physical media or the like, it has been well-known that the method for employing plural thread processes at a time so as to conduct the initialization processing in parallel, is more speedy rather than the other method for employing a single thread process so as to sequentially conduct the initialization processing one by one.

Specifically, since most of the color image processing apparatuses and most of the color image forming apparatuses are provided with hardware devices being equivalent for every primary color, the processing velocity of such the apparatus has been improved by employing the simultaneous and parallel processing as abovementioned. In this connection, with respect to this kind of processing, Tokkohei 2-22377 (Japanese Patent Publication) sets forth a proposal in regard to an efficient processing method.

According to the prior art technology set forth in Tokkohei 2-22377, a different CPU is allotted to the operating section side in order to improve the responsivity. Concretely speaking, according to the invention set forth in Tokkohei 2-22377, various kinds of control CPUs, being different from each other in the heterogeneous multi core environment, are made to have separate roles, such as a controlling CPU, a managing CPU, etc., so as to smoothly implement various kinds of operations.

By employing the abovementioned technology, although it becomes possible to improve the responsivity, there have arisen other problems that the cost of the total system has increased, the communication controlling operation in conjunction with the total system has become necessary, etc. For instance, in the system in which the SMP-type (Symmetrical Multi-Processing type) OS is installed, the processing capability is improved by automatically allotting a plurality of thread processes to the cores being in midcourse of idling. When the abovementioned SMP-type OS is employed, a single OS is developed into a common memory of CPU cores, so as to allot various kinds of processing, such as application software, etc., to the plurality of CPU cores under the controlling operation of the single OS concerned.

Further, there has been employed such an OS that is provided with a hardware affinity mechanism to prevent the multi core CPU from generating deviations of dispatch timings in the real time processing environment, like that in the copier, and it is expected that the abovementioned OS will be increasingly utilized in this field.

However, in any one of the conventional apparatuses, such as an image forming apparatus, etc., no method for solving the aforementioned problems has existed so far and at present.

SUMMARY OF THE INVENTION

To overcome the abovementioned drawbacks in conventional information processing apparatuses, it is one of objects of the present invention to provide an information processing apparatus, in which various kinds of information are processed in either the real time processing mode or the non-real time processing mode, both co-existing in the apparatus, and which makes it possible to suppress the occurrence frequency of the wasted scheduling operations and the delay of the real-time processing, so as to perform a high-efficient controlling operation being higher than ever.

Accordingly, at least one of the objects of the present invention can be attained by any one of the information processing apparatuses described as follows.

(1) According to an information processing apparatus reflecting an aspect of the present invention, the information processing apparatus comprises: an operation display section to accept an inputted instruction in regard to an operation and to display various kinds of screens thereon; an image processing section to apply a processing to image information; and a processor that is provided with a plurality of same cores; wherein a real-time processing unnecessary process that is related to the operation display section and that does not require a real-time processing, is fixed onto one of the plurality of same cores so that the one of the plurality of same cores is in charge of controlling the real-time processing unnecessary process, while, a real-time processing necessary process that is related to the image processing section and that is required to be operationally linked with the real-time processing unnecessary process, is fixed onto another one of the plurality of same cores so that the other one of the plurality of same cores is in charge of controlling the real-time processing necessary process.

(2) According to an information processing apparatus reflecting another aspect of the present invention, the information processing apparatus comprises: an operation display section to accept an instruction inputted in regard to an operation and to display various kinds of screens thereon; an image processing section to apply a processing to image information; and a processor that is provided with a plurality of same cores; wherein one of the plurality of same cores is in charge of a controlling operation for accepting the instruction inputted from the operation display section, another controlling operation for displaying various kinds of screens onto the operation display section, and still another controlling operation for managing a processing to be conducted in the image processing section as a real-time processing unnecessary processes that does not require a real-time processing, while, another one of the plurality of same cores is in charge of yet another controlling operation for applying the processing to the image information in the image processing section as a real-time processing necessary process that requires a real-time processing.

(3) According to still another aspect of the present invention, in the information processing apparatus recited in item 2, yet the other controlling operation to be conducted by the other one of the plurality of same cores for applying the processing to the image information is such a controlling operation in regard to a process that requires an operation finalization synchronizing with the controlling operation to be conducted by the one of the plurality of same cores.

(4) According to still another aspect of the present invention, in the information processing apparatus recited in item 1 or item 2, the real-time processing unnecessary process is such a processing operation that is related to an ejecting operation for ejecting a recording medium onto which an image is formed.

(5) According to still another aspect of the present invention, in the information processing apparatus recited in item 1 or item 2, the real-time processing unnecessary process is a managing operation for managing a job.

(6) According to still another aspect of the present invention, in the information processing apparatus recited in item 1 or item 2, the real-time processing unnecessary process is a creating operation for creating a thumbnail image of an image to be formed.

(7) According to still another aspect of the present invention, in the information processing apparatus recited in item 1 or item 2, the real-time processing unnecessary process is a managing operation for managing an interruption image forming output, or a managing operation for managing a sample image forming output.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 2 shows an explanatory schematic diagram, indicating operations to be conducted in the present embodiment.

DETAILED DESCRIPTION OF THE PREFERRED EMBODIMENT

Figure 1:
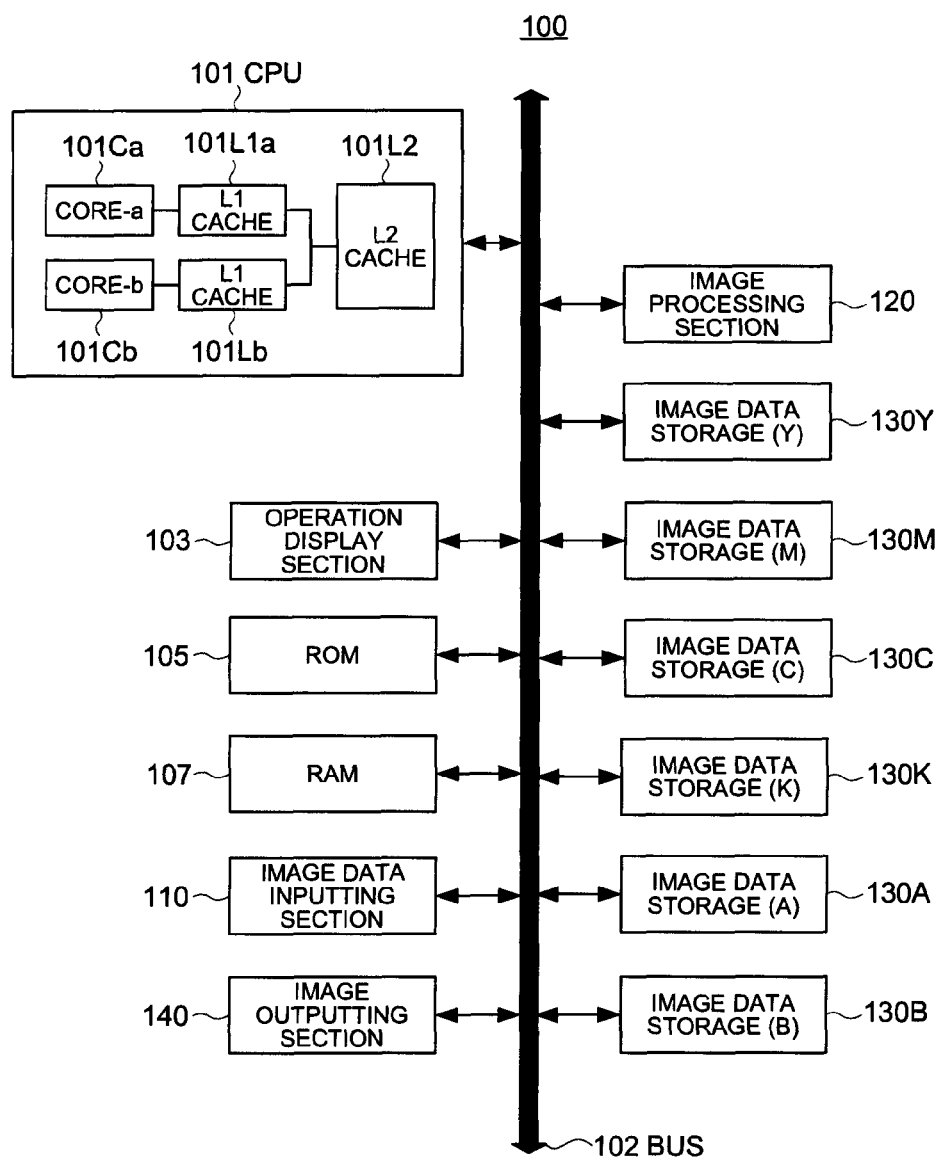
FIG. 1 shows a schematic diagram indicating a rough configuration of an information processing apparatus embodied in the present invention.

Referring to the drawings, an image processing apparatus, embodied in the present invention, will be detailed in the following as the preferred embodiment of the present invention.

<Configuration of Image Processing Apparatus 100>

Now, referring to the block diagram shown in FIG. 1, the configuration of an image processing apparatus 100, embodied in the present invention as the first embodiment, will be detailed in the following.

In this connection, although various kinds of image processing apparatuses can serve as the image processing apparatus 100, embodied in the present invention, hereinafter, either a MFP (Multi Function Peripheral) that is provided with functions of a scanner, a copier, a printer and a facsimile apparatus, or a copier is exemplified as an concrete example of the present invention. In other words, the configurations of the copier and the printer will be detailed as the concrete example of the image processing apparatus in the following. Therefore, the main processing exemplified in the present embodiment is a print processing as the image processing operation in the claims.

Further, explanations, in regard to the generally well-known sections included in the image processing apparatus 100 and the general purpose sections that do not directly relate to the actions and the controlling operations to be characterized by the present invention, will be omitted in the following.

The image processing apparatus 100, embodied in the present invention, is constituted by a CPU (Central Processing Unit) 101 provided with a plurality of same cores serving as a controlling section to control various kinds of the sections therein, a system bus 102, an operation display section 103, a ROM (Read Only Memory) 105, a RAM (Random Access Memory) 107, an image data inputting section 110, an image processing section 120, an image data storage 130 (including 130Y, 130M, 130C, 130K, 130A, 130B) and an image outputting section 140, which are coupled to each other through the system bus 102.

Based on the OS (Operating System) or the firmware, etc., currently installed in the image processing apparatus 100, the CPU 101 controls various kinds of sections constituting the image processing apparatus 100 and conducts various kinds of arithmetic calculation processing, according to the controlling program of the image processing apparatus 100, so as to totally conduct the image processing apparatus as a whole.

Further, the CPU 101 is such a homogeneous multi-core CPU that is constituted by a core 101Ca, a core 101Cb, an L1 cache memory 101L1a for the core 101Ca, an L1 cache memory 101L1b for the core 101Cb and an L2 cache memory 101L2 serving as a common memory for both the core 101Ca and the core 101Cb. In this connection, although the number of cores is two in the present embodiment, it is also applicable that the number of cores is more than two.

The operation display section 103 displays various kinds of messages thereon, based on the instruction issued by the CPU 101, and accepts operations conducted by the user so as to transmit instructions inputted by the user to the CPU 101.

The ROM 105 serves as such a read only memory that stores the BIOS (Basic Input Output System) and various kinds of programs, therein. In this connection, the BIOS is such a program (firmware) that is executed for controlling the basic operations of the CPU 101. Further, the BIOS is initially executed in the event of booting the CPU 101, so as to implement the POST (Power On Self Test) for initializing each of the components.

The RAM 107 serves as such a volatile memory that is used as a working memory area (main memory) of the CPU 101. For instance, the RAM 107 is a volatile memory that temporarily stores the OS, the controlling programs, etc., which are stored in the ROM 105, the processed data, etc., which are stored in the image data storage 130, etc., therein.

The image data inputting section 110 serves as an image inputting device, such as a scanner, etc., which reads an image from a document so as to input image data therefrom. Further, the image data inputting section 110 that reads the image residing on the document so as to acquire the image data of the document image, is constituted by a scanning light source section, a scanning mirror section, a focusing lens, a CCD (Charge Coupled Device) image sensor, etc., which are not shown in the drawings. In this connection, when the image processing apparatus 100 is a video recording apparatus or the like, at least one of a video input terminal, a tuner, a DVD player, etc., corresponds to the image data inputting section 110.

The image processing section 120 applies various kinds of image processing to the data (image data or video data) to be processed in the image processing apparatus 100, as needed. In this connection, on that occasion, the image processing section 120 makes the image data storage 130 store the image data to be processed or the other image data in midcourse of the processing or still the other image data after the processing, as spool data, therein, until the image outputting operation is completed.

The image data storage 130 is such a mass storage device that is configured as the nonvolatile storage section (nonvolatile storage device) in which various kinds of image data and various kinds of data are stored. In this connection, the image data storage 130 exemplified in this embodiment is provided with a plurality of image data storages including the image data storage 130Y for color Y (Yellow), the image data storage 130M for color M (Magenta), the image data storage 130C for color C (Cyan), the image data storage 130K for color K (Black), the image data storage 130A for other data and the image data storage 130B for still other data.

When the image processing apparatus 100 is configured as the MFP (Multi Function Peripheral) aforementioned, it is possible to configure the image outputting section 140 as a printer that forms a toner image on a recording medium. In this connection, when the image processing apparatus 100 is a video recording apparatus or the like, at least one of a video output terminal, a video display device, etc., corresponds to the image outputting section 140.

<Operations of Image Processing Apparatus 100>

Referring to the explanatory schematic diagram shown in FIG. 2 and the flowchart shown in FIG. 3, the backup processing operations to be conducted by the image processing apparatus 100, embodied in the present invention, will be detailed in the following.

Conventionally, with respect to the operation for assigning plural processing processes to plural CPUs in a unit of job or in a unit of page, there have been issued many proposals, and according to the most of them, the plural processing processes are respectively assigned to the plural CPUs being physically different from each other. However, according to such the conventional methods, there have arisen not only cost increase problems, but also many other new problems, such that communication processing between the concerned CPUs becomes necessary, or the like. Accordingly, it can be predicted that the abovementioned problems can be solved by assigning the plural processing processes to plural cores provided in a multi-core CPU in a unit of job or in a unit of page.

For instance, when a dual-core CPU, including two cores, is employed, one of the two cores is used for conducting the main-body controlling operations, such as an image processing operation, etc., while another one of the two cores is used for controlling the operation display section 103, in the normal state. Then, in such a state that the operation display section 103 is deactivated due to the power saving mode of the apparatus, the processing processes included in the image processing operation concerned are automatically assigned to both of the two cores, so as to improve the efficiency of the print processing operations.

By dynamically changing the way of utilizing the cores concerned, it becomes possible to conduct an optimized processing operation that cannot be achieved by a plurality of single-core CPUs. Further, a priority degree of such a process that has a little relationship with the print processing operation is established as a low value, and, by assigning the processes having low priority values to separate cores, it becomes possible to realize the optimized processing operation so as to suppress the influence upon the print processing operations to a minimum level. The abovementioned facts, etc., can be cited as the examples of improving the efficiency of the print processing operations above-mentioned.

However, it has been still unclear what kind of assigning method is the optimum method, and the optimum method may vary for every application program. Specifically, in the print production apparatus that requires a high-speed operation, sometimes, the processing devices, which respectively correspond to the primary colors, are provided in parallel. For such the print production apparatus, it is necessary to use the cores concerned, so as to take advantage of the abovementioned configuration and to improve the job processing efficiency by increasing the effect of this task parallelism. To achieve the abovementioned goal, an example of the assigning method will be detailed in the following.

For instance, in the following case, it is possible to improve the performance and the efficiency of debagging operation by employing the segmentation method being finer than ever.

The present inventor would like to propose a novel method for controlling the copier, which is characterized in that the abovementioned process clone method is employed in the job controlling operation described in the following.

In the present embodiment, each of processes, such as a scanner process and a print controlling process, is defined as a real-time processing necessary process, while, each of other processes, for instance, a sample paper-sheet ejecting process, a job ticket editing process, a thumbnail creating process, a job schedule editing process, an emergency processing process, etc., is defined as a real-time processing unnecessary process, so as to assign them to the separate cores of the CPU 101, respectively.

In the abovementioned embodiment, the implementation of the sample paper-sheet ejecting process or the like is triggered by depressing a specific button provided in the operating section during the activated state and is performed in parallel with the other operations. Accordingly, by processing the button depressing message on the specific core that currently operates the operating section, it desirably becomes possible to achieve the optimum response without shifting the cores from one to another.

Since the actual printing operation is performed in the real time operating mode by the core being separate from the specific core that currently operates the operating section, and the operations for instructing the paper-sheet ejection and managing the ejection statuses (number of paper sheets, page information, etc.) are the real-time processing unnecessary process, by fixing the tasks for controlling the sample paper-sheet ejecting process onto the specific core that currently operates the operating section, it becomes possible to optimize the responsivity of the operating section without impeding the progress of the print processing operation.

In the normal practice, each of the processes is assigned in advance to corresponding one of the cores in the controlling program, as shown in FIG. 2.

hardware real time family: process response (write control, scanner control, ASIC (Application Specific Integrated Circuit) image processing, storage control)

software real time family: external storage processing, operating section control, communication control (network application program including main-body control)

non real time family: device initialization processing, network application program (web, etc.), utility processing (backup, restore)

Since the dual core CPU is provided with only two cores, each of the processes in the hardware real time family is regarded as the real-time processing necessary process, while each of the other processes in the software real time family is regarded as the real-time processing unnecessary process, so that the processes and the other processes are assigned to the separate cores, respectively.

Further, the programs, categorized in the low-priority non real-time family except the initialization processing, are installed in such a manner that the SMP-type (Symmetrical Multi-Processor type) OS is in charge of the core assigning operation. By holding them within a range of one core, it is possible to conduct the process operations more efficiently than ever, since the memory-cache hitting rate increases. For this reason, it becomes indispensable to employ the BMP-type (Basic Multilingual Plane type) OS having an affinity mechanism.

Generally speaking, the print production apparatus is provided with a sample outputting function so as to inspect the contents of the print product outputted in midcourse of implementing the print job concerned. The sample outputting function is such a function that, in midcourse of implementing the printing operation based on a certain normal print job, in response to the operation for depressing the "SAMPLE OUTPUT" button of the operation display section 103, a small number of recording paper sheets, onto which the sample images are outputted, are ejected onto a separate tray, and is achieved by temporarily changing the process settings.

In the conventional print production apparatus that has employed the single-core CPU, the samples to be outputted are sequentially created within each of interim periods of the print outputting operation in the normal image forming process by changing the normal process settings, and the sample outputting operation is implemented by changing the outputting path and the ejecting tray. After that, the normal process settings are resumed so as to continue the implementation of the normal image forming process. Alternatively, it is also applicable that an exclusive process for outputting the samples is booted so as to conduct the sample outputting operation.

When the abovementioned sample outputting operation is periodically implemented, the management of a number of the output copies, etc., is implemented by employing a counter. However, although the above-managing operation is implemented at the output process side or the instruction process side, the real-time processing is not necessary, if the output timings are matched with each other.

Accordingly, although it is applicable on the single-core CPU that the abovementioned operation is installed as a management process, even if the real-time controlling operations of the counter management and the printing operation are respectively implemented on the separate cores, no problem would arise, and the influence to the real time operation is made to decrease, and further, operations for accepting the other processing, etc., becomes advantageous.

The present inventor has revealed that, since the operations, such as the sample outputting operation, etc., adds the count processing to the normal operations though its influence is trivial, it gives a good influence to the total productivity to implement the abovementioned operations in the non real-time operating mode, rather than to implement them within the real-time resources. Further, if the SMP-type OS is employed, it is possible to control the counting variable on the common memory, and accordingly, it becomes possible to achieve an efficient installation, which makes an installation change amount small.

As described in the foregoing, when the multi-core CPU is employed, the controlling operations in regard to the processes involved with the operation display section 103, which do not require the real-time processing, are fixed onto one of the two cores of the multi-core CPU so as to make it in charge of the controlling operations, while, the other controlling operations in regard to the other processes involved with the printing operations, which serve as the real-time processing necessary process and require operational linkages with the abovementioned processes, are fixed onto the other one of the two cores of the multi-core CPU so as to make it in charge of the other controlling operations. Further, with respect to the sample outputting operation, the former one of the two cores of the multi-core CPU is in charge of handling the sample outputting operation, serving as the real-time processing unnecessary process.

Further, by handling the sample outputting operation as the real-time processing unnecessary process as mentioned in the above, it becomes possible for the user to set the periodic output counter at an arbitral timing more flexible than ever, for instance, compared to such a case that the sample outputting operation is controlled by employing the conventional method. Conventionally, sometimes, there has occurred such the case that, since a current real-time operation impedes implementation of the sample outputting operation, the controlling operations towards the counter management process are interrupted by such the current real-time operation. However, according to the present invention, since the sample outputting operation is conducted by the separate core and does not directly receive any restriction from the real-time operations, it becomes possible to implement the counter setting operation (and the user's GUI (Graphical User Interface) operation) at arbitral timing without influencing the productivity of the apparatus concerned.

Still further, generally speaking, since the GUI inputting operation and the counter management operation are the separate processes, the counter processing does not stop even in midcourse of the GUI inputting operation. Since the abovementioned core assigning method can be applied to any operation in which the user's GUI and the value management process are linked with each other, other than the sample outputting operation, it becomes possible to improve the usability and the productivity of the apparatus concerned without considerably changing the conventional mounting practice. Since the GUI processing is assigned to the core as the non real-time processing, it is desirable from the cache co-owning point of view.

Specifically, in the job scheduling screen for controlling a plurality of jobs in the form of the Gantt chart, or the like, since it is necessary to apply the depiction updating operation to many graphical elements in midcourse of implementing the real time operation, the effect of fixing the core assigning becomes large.

Figure 3:
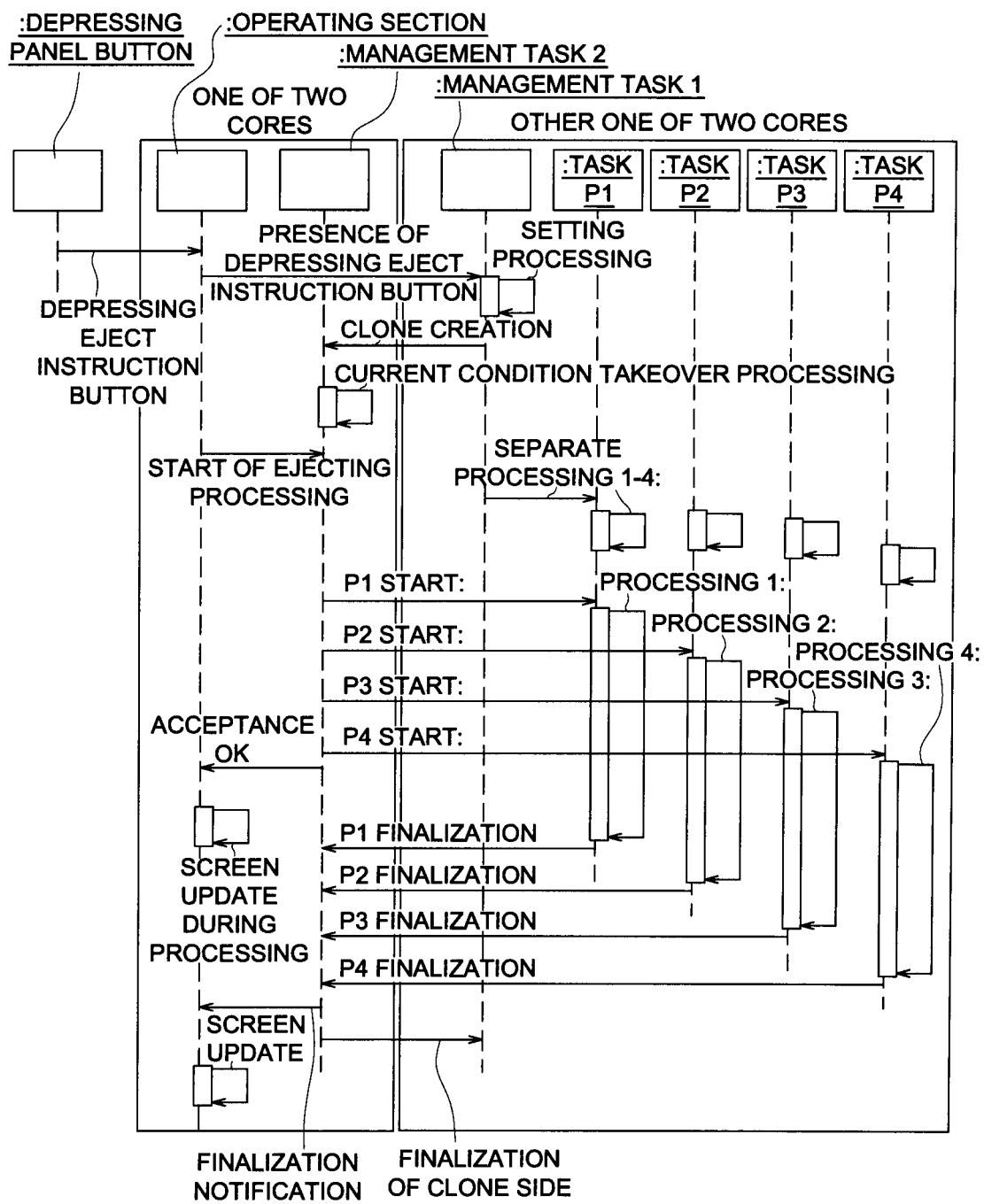
FIG. 3 shows a time chart, indicating operations to be conducted in the present embodiment.

FIG. 3 shows a time chart, indicating relationships between the processes to be conducted on both of the two cores, when the image forming operation is performed in the image processing apparatus 100, based on the assigning method described in the foregoing. As shown in FIG. 3, in response to the depressing action onto the operation display section 103, the real-time processing unnecessary process, such as a job management operation, etc., is implemented by one of the two cores, while, the real-time processing necessary process, such as an image forming operation, etc., is implemented by the other one of the two cores. Further, with respect to the finalization of the image forming process, the other one of the two cores notifies the one of the two cores of the finalization, so as to implement the job finalization processing.

In other words, as described in the foregoing, with respect to the controlling operations to be conducted by the CPU provided with a plurality of same cores in the information processing apparatus, the real-time processing unnecessary processes related to the operating section are fixed to the one of the two cores so that the one of the two cores is in charge of the controlling operation of them, while, the real-time processing necessary processes related to the image processing section that is required to be operationally linked with the process, are fixed to the other one of the two cores so that the other one of the two cores is in charge of the controlling operation of them. Accordingly, since more than two of the parallel processing processes that conduct the real-time processing and the single parallel processing process that conducts the non real-time processing for managing the group of above processes are implemented by the separate cores, respectively, it becomes possible to suppress the occurrence frequency of the wasted scheduling operations and the delay of the real-time processing, and as a result, a high-efficient copy controlling operation can be achieved.

Further, with respect to the controlling operations to be conducted by the CPU provided with a plurality of same cores in the information processing apparatus, the one of the two cores is in charge of the controlling operations for accepting said instruction inputted from said operation display section, the controlling operations for displaying various kinds of screens onto the operation display section and the operations for controlling the management of the processing to be conducted in the image processing section as the real-time processing unnecessary processes, while, the other one of the two cores is in charge of the controlling operations for processing the image information in the image processing section as the real-time processing necessary processes. Accordingly, since more than two of the parallel processing processes that conduct the real-time processing and the single parallel processing process that conducts the non real-time processing for managing the group of above processes are implemented by the separate cores, respectively, it becomes possible to suppress the occurrence frequency of the wasted scheduling operations and the delay of the real-time processing, and as a result, a high-efficient copy controlling operation can be achieved.

Namely, according to the present invention, since more than two of the parallel processing processes that conduct the real-time processing and the single parallel processing process that conducts the non real-time processing for managing the group of above processes are implemented by the separate cores, respectively, it becomes possible to suppress the occurrence frequency of the wasted scheduling operations and the delay of the real-time processing, and as a result, a high-efficient copy controlling operation can be achieved.

According to the present invention, the following effect can be attained.

With respect to the controlling operations to be conducted by the processor provided with a plurality of same cores in the information processing apparatus, the real-time processing unnecessary processes related to the operating section are fixed to the one of the two cores so that the one of the two cores is in charge of the controlling operation of them, while, the real-time processing necessary processes related to the image processing section that is required to be operationally linked with the process, are fixed to the other one of the two cores so that the other one of the two cores is in charge of the controlling operation of them. Accordingly, since more than two of the parallel processing processes that conduct the real-time processing and the single parallel processing process that conducts the non real-time processing for managing the group of above processes are implemented by the separate cores, respectively, it becomes possible to suppress the occurrence frequency of the wasted scheduling operations and the delay of the real-time processing, and as a result, a high-efficient copy controlling operation can be achieved.

Further, with respect to the controlling operations to be conducted by the processor provided with a plurality of same cores in the information processing apparatus, the one of the two cores is in charge of the controlling operations for accepting said instruction inputted from said operation display section, the controlling operations for displaying various kinds of screens onto the operation display section, and the operations for controlling the management of the processing to be conducted in the image processing section as the real-time processing unnecessary processes, while, the other one of the two cores is in charge of the controlling operations for processing the image information in the image processing section as the real-time processing necessary processes. Accordingly, since more than two of the parallel processing processes that conduct the real-time processing and the single parallel processing process that conducts the non real-time processing for managing the group of above processes are implemented by the separate cores, respectively, it becomes possible to suppress the occurrence frequency of the wasted scheduling operations and the delay of the real-time processing, and as a result, a high-efficient copy controlling operation can be achieved.

Namely, according to the present invention, since more than two of the parallel processing processes that conduct the real-time processing and the single parallel processing process that conducts the non real-time processing for managing the group of above processes are implemented by the separate cores, respectively, it becomes possible to suppress the occurrence frequency of the wasted scheduling operations and the delay of the real-time processing, and as a result, a high-efficient copy controlling operation can be achieved.

While the preferred embodiments of the present invention have been described using specific term, such description is for illustrative purpose only, and it is to be understood that changes and variations may be made without departing from the spirit and scope of the appended claims.

What is claimed is:

1. An information processing apparatus, comprising:
an operation display section to accept an inputted instruction in regard to an operation and to display various kinds of screens thereon;

an image processing section to apply a processing to image information; and a processor that is provided with a plurality of same cores;

wherein a real-time processing unnecessary process that is related to the operation display section and that does not require a real-time processing, is fixed onto one of the plurality of same cores so that the one of the plurality of same cores is in charge of controlling the real-time processing unnecessary process, while, a real-time processing necessary process that is related to the image processing section and that is required to be operationally linked with the real-time processing unnecessary process, is fixed onto another one of the plurality of same cores so that the other one of the plurality of same cores is in charge of controlling the real-time processing necessary process.

2. The information processing apparatus of claim 1,
wherein the real-time processing unnecessary process is such a processing operation that is related to an ejecting operation for ejecting a recording medium onto which an image is formed.

3. The information processing apparatus of claim 1,
wherein the real-time processing unnecessary process is a managing operation for managing a job.

4. The information processing apparatus of claim 1,
wherein the real-time processing unnecessary process is a creating operation for creating a thumbnail image of an image to be formed.

5. The information processing apparatus of claim 1,
wherein the real-time processing unnecessary process is a managing operation for managing an interruption image forming output, or a managing operation for managing a sample image forming output.

6. An information processing apparatus, comprising:
an operation display section to accept an instruction inputted in regard to an operation and to display various kinds of screens thereon;

an image processing section to apply a processing to image information; and a processor that is provided with a plurality of same cores;

wherein one of the plurality of same cores is in charge of a controlling operation for accepting the instruction inputted from the operation display section, another controlling operation for displaying various kinds of screens onto the operation display section, and still another controlling operation for managing a processing to be conducted in the image processing section as a real-time processing unnecessary processes that does not require a real-time processing, while, another one of the plurality of same cores is in charge of yet another controlling operation for applying the processing to the image information in the image processing section as a real-time processing necessary process that requires a real-time processing.

7. The information processing apparatus of claim 6,
wherein yet the other controlling operation to be conducted by the other one of the plurality of same cores for applying the processing to the image information is such a controlling operation in regard to a process that requires an operation finalization synchronizing with the controlling operation to be conducted by the one of the plurality of same cores.

8. The information processing apparatus of claim 6,
wherein the real-time processing unnecessary process is such a processing operation that is related to an ejecting operation for ejecting a recording medium onto which an image is formed.

9. The information processing apparatus of claim 6,
wherein the real-time processing unnecessary process is a managing operation for managing a job.

10. The information processing apparatus of claim 6,
wherein the real-time processing unnecessary process is a creating operation for creating a thumbnail image of an image to be formed.

11. The information processing apparatus of claim 6,
wherein the real-time processing unnecessary process is a managing operation for managing an interruption image forming output, or a managing operation for managing a sample image forming output.

\* \* \* \* \*